(12) United States Patent
Mitchell

(10) Patent No.: US 11,183,050 B2
(45) Date of Patent: Nov. 23, 2021

(54) THREE-DIMENSIONAL SCANNING AND TRACKING DEVICE

(71) Applicant: Arrie Mitchell, Apopka, FL (US)

(72) Inventor: Arrie Mitchell, Apopka, FL (US)

(*) Notice: Subject to any disclaimer, the term of this patent is extended or adjusted under 35 U.S.C. 154(b) by 0 days.

(21) Appl. No.: 16/932,119

(22) Filed: Jul. 17, 2020

(65) Prior Publication Data
US 2021/0027607 A1    Jan. 28, 2021

Related U.S. Application Data

(60) Provisional application No. 62/878,847, filed on Jul. 26, 2019.

(51) Int. Cl.
| | | |
|---|---|---|
| G08B 21/24 | (2006.01) | |
| G06T 7/00 | (2017.01) | |
| H04N 9/31 | (2006.01) | |
| G06K 7/14 | (2006.01) | |
| G06K 7/10 | (2006.01) | |
| H04N 13/204 | (2018.01) | |

(52) U.S. Cl.
CPC ......... *G08B 21/24* (2013.01); *G06K 7/10722* (2013.01); *G06K 7/1413* (2013.01); *G06T 7/0002* (2013.01); *H04N 9/31* (2013.01); *H04N 13/204* (2018.05); *G06T 2200/04* (2013.01)

(58) Field of Classification Search
CPC .............................. G08B 21/24; G06T 7/0002
USPC ............................................................ 348/40
See application file for complete search history.

(56) References Cited

U.S. PATENT DOCUMENTS

| | | | |
|---|---|---|---|
| 10,268,892 B1* | 4/2019 | Miller | H02J 7/025 |
| 2019/0073760 A1* | 3/2019 | Wang | B25J 9/1697 |
| 2020/0034983 A1* | 1/2020 | Finkelstein | G06T 7/251 |

* cited by examiner

*Primary Examiner* — Jeffery A Williams
(74) *Attorney, Agent, or Firm* — The Iwashko Law Firm, PLLC; Lev Ivan Gabriel Iwashko

(57) ABSTRACT

A three-dimensional scanning and tracking device to track at least one item, the three-dimensional scanning and tracking device including a main body, an imaging unit disposed on at least a portion of the main body, a display unit disposed on at least a portion of a center of the main body, a scan button disposed on at least a portion of the main body to scan a barcode of the at least one item using the imaging unit in response to depressing the scan button and orienting the imaging unit toward the barcode, and a camera button disposed on at least a portion of the main body to perform a three-dimensional image capture of the at least one item in response to depressing the camera button and orienting the imaging unit toward the at least one item, such that a three-dimensional image of the at least one item is created and displayed on the display unit.

5 Claims, 1 Drawing Sheet

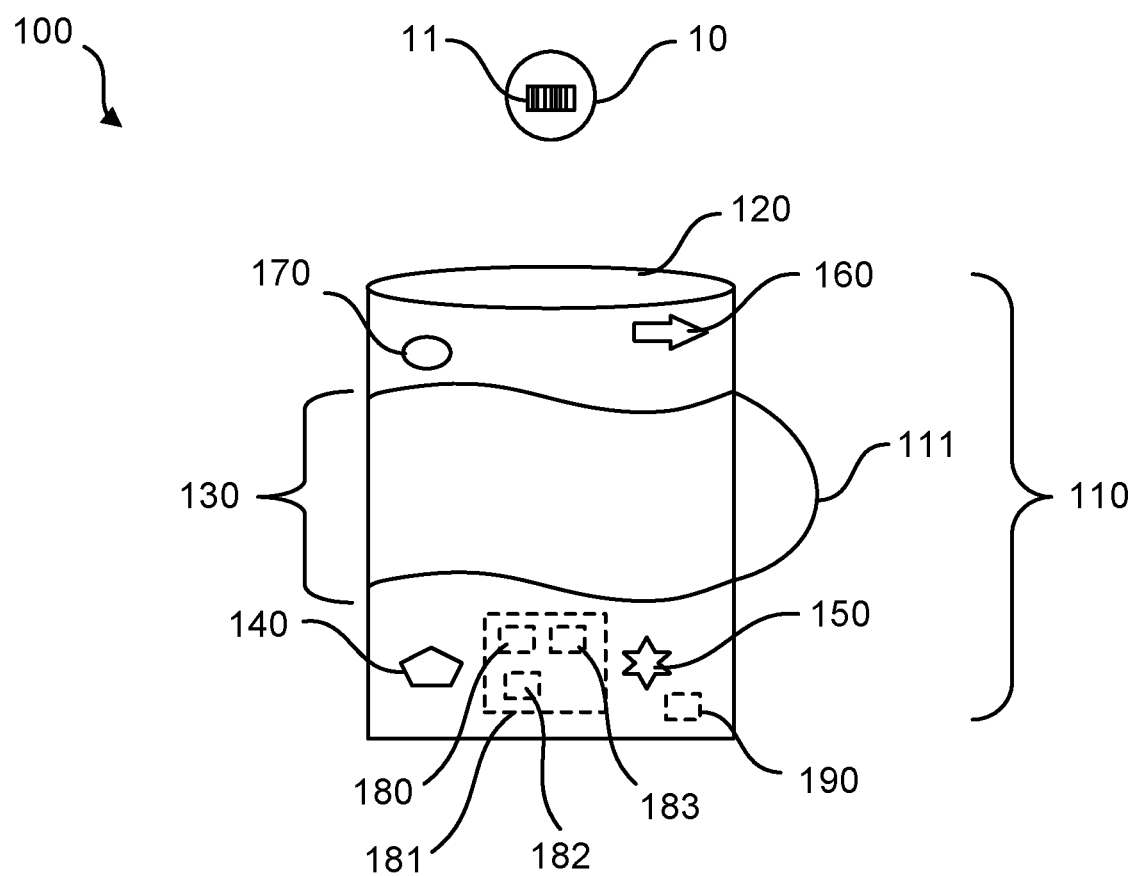

THREE-DIMENSIONAL SCANNING AND TRACKING DEVICE

CROSS REFERENCE TO RELATED APPLICATION

This application claims the benefit of, and incorporates by reference, U.S. provisional patent application Ser. No. 62/878,847, entitled "Three-Dimensional Scanning and Tracking Device," which was filed on Jul. 26, 2019.

BACKGROUND

1. Field

The present general inventive concept relates generally to a scanning device, and particularly, to a three-dimensional scanning and tracking device.

2. Description of the Related Art

When people seek a new home, they may request assistance from a professional moving company. However, moving can be a stressful process due to packaging and transporting of items from an old home to the new home. In particular, people may forget a condition of the items prior to moving.

Also, keeping a list of a number of items can make the moving process difficult.

Therefore, there is a need for a scanning device that can take an image of a device, as well as, track a number of items being moved.

SUMMARY

The present general inventive concept provides a three-dimensional scanning and tracking device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a three-dimensional scanning and tracking device to track at least one item, the three-dimensional scanning and tracking device including a main body, an imaging unit disposed on at least a portion of the main body, a display unit disposed on at least a portion of a center of the main body, a scan button disposed on at least a portion of the main body to scan a barcode of the at least one item using the imaging unit in response to depressing the scan button and orienting the imaging unit toward the barcode, and a camera button disposed on at least a portion of the main body to perform a three-dimensional image capture of the at least one item in response to depressing the camera button and orienting the imaging unit toward the at least one item, such that a three-dimensional image of the at least one item is created and displayed on the display unit.

The three-dimensional scanning and tracking device may further include a control unit disposed within at least a portion of the main body to store data including the three-dimensional image and the barcode of the at least one item.

The three-dimensional scanning and tracking device may further include a transmission button disposed on at least a portion of the main body to transmit the data to another three-dimensional scanning and tracking device in response to being depressed.

The control unit may create a missing alert in response to determining the at least one item is missing after receiving a complete message of a move from the another three-dimensional scanning and tracking device.

The control unit may compare the three-dimensional image to a current state of the at least on item in response to depressing the camera button, such that the imaging unit performs another three-dimensional image capture.

The control unit may zoom in on a portion the at least one item on the display unit in response to identifying the at least one item has been damaged based on the comparison.

The scan button and the camera button depressed simultaneously may create a holographic projection from the display unit of the damage on the at least one item.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a front perspective view of a three-dimensional scanning and tracking device, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the FIGURES, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Three-Dimensional Scanning and Tracking Device 100
Main Body 110
Imaging Unit 120
Display Unit 130
Scan Button 140
Camera Button 150
Transmission Button 160
Power Button 170
Control Unit 180
Processing Unit 181
Communication Unit 182
Storage Unit 183
Power Source 190

FIG. 1 illustrates a front perspective view of a three-dimensional scanning and tracking device 100, according to an exemplary embodiment of the present general inventive concept.

The three-dimensional scanning and tracking device 100 may be constructed from at least one of metal, plastic, wood, glass, and rubber, etc., but is not limited thereto.

The three-dimensional scanning and tracking device 100 may include a main body 110, an imaging unit 120, a display unit 130, a scan button 140, a camera button 150, a transmission button 160, a power button 170, a control unit 180, and a power source 190, but is not limited thereto.

The main body 110 may include a handle 111, but is not limited thereto.

The handle 111 may facilitate gripping the main body 110.

The main body 110 may have any predetermined size. For example, the main body 110 may be similar in size to a mobile device, such as a cell phone and/or a tablet, but is not limited thereto.

The imaging unit 120 may include a camera and/or a scanner, but is not limited thereto.

The display unit 130 may include a plasma screen, an LCD screen, a light emitting diode (LED) screen, an organic LED (OLED) screen, a computer monitor, a hologram output unit, a sound outputting unit, or any other type of device that visually or aurally displays data. Optionally, the display unit 130 may be combined as an input unit to be a touch-screen.

At least one item 10 may include furniture, a box, a vehicle, and/or any other object. A barcode 11 may be removably disposed upon a surface of the at least one item 10. For example, the barcode 11 may be a substrate that uses an adhesive to be disposed on the at least one item 10.

The scan button 140 may be disposed on at least a portion of the main body 110. The scan button 140 may be depressed a first time to activate a first mode of the imaging unit 120. Specifically, the imaging unit 120 may perform a scan of the barcode 11 in response to a user depressing the scan button 140. Additionally, the user may orient the imaging unit 120 toward the barcode 11, such that the barcode 11 may appear on the display unit 130.

Subsequently, the scan button 140 may be depressed a second time to complete scanning.

The camera button 150 may be disposed on at least a portion of the main body 110. The camera button 150 may be depressed a first time to activate a second mode of the imaging unit 120. Specifically, the imaging unit 120 may perform a three-dimensional image capture of the at least one item 10 in response to the user depressed the camera button 150. Additionally, the user may orient the imaging unit 120 toward the at least one item 10, such that the at least one item 10 may appear on the display unit 130.

Furthermore, the user may move around the at least one item 10 to capture multiple angles of a three-dimensional image of the at least one item 10. Subsequently, the camera button 150 may be depressed a second time to complete capture of the three-dimensional image. The three-dimensional image capture of the at least one item 10 may appear on the display unit 130. Moreover, the at least one item 10 may rotate in response to touching by the user of the display unit 130. As such, the user may examine an original state of the at least one item 10 prior to retrieval by a moving company.

The transmission button 160 may be disposed on at least a portion of the main body 110.

The power button 170 may be disposed on at least a portion of the main body 110. The power button 170 may be depressed a first time to turn on the three-dimensional scanning and tracking device 100. The power button 170 may be depressed a second time to turn off the three-dimensional scanning and tracking device 100.

The control unit 180 may include a processing unit 181, a communication unit 182, and a storage unit 183, but is not limited thereto.

The control unit 180 may be disposed within at least a portion of an interior of the main body 110.

The processing unit 181 (or central processing unit, CPU) may include electronic circuitry to carry out instructions of a computer program by performing basic arithmetic, logical, control and input/output (I/O) operations specified by the instructions. The processing unit 181 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 181 may also include a microprocessor and a microcontroller.

The communication unit 182 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 183 may include a random access memory (RAM), a read-only memory (ROM), a hard disk, a flash drive, a database connected to the Internet, cloud-based storage, Internet-based storage, or any other type of storage unit.

The processing unit 181 may store data on the storage unit 183, such that the data may be at least one of the three-dimensional image of the at least one item 10 and the barcode 11. As such, the storage unit 183 may store a record of the original state of the at least one item 10 prior to retrieval by the moving company. Also, data from the barcode 11 may contain at least one of content of the at least one item 10, a number of objects associated with the at least one item 10, and a condition rating of the at least one item 10.

The processing unit 181 may retrieve the data from the storage unit 183 to send to the communication unit 182 in response to the user depressing the transmission button 160. The communication unit 182 may transmit the data to another three-dimensional scanning and tracking device 100. For example, an owner of the at least one item 10 may transmit the data to a mover. The mover may record additional information of the owner on the another three-dimensional scanning and tracking device 100, such as name, order information, moving company data, current address, and phone number.

Alternatively, the scan button 140 and the camera button 150 may be depressed simultaneously to enable a holographic projection of the at least one item 10 from the display unit 130. In other words, the holographic projection may focus on the damaged section that was determined by the processing unit 181. As such, the holographic projection may facilitate viewing of the at least one item 10 for the user.

After the move has occurred, the user may use the three-dimensional scanning and tracking device 100 to check a current state of the at least one item 10. Specifically, the scan button 140 may be depressed to scan the barcode 11 to confirm at least one of the content of the at least one item 10, the number of objects associated with the at least one item 10, and the condition rating of the at least one item 10. As such, the user may view on the display unit 130 whether the owner owns the at least one item 10 that was delivered and/or whether at least one other item is missing from the move.

Additionally, the camera button 150 may be depressed to scan the at least one item 10 to compare the current state of the at least one item 10 to the original state of the at least one item 10 stored on the storage unit 183. In other words, the user may inspect two images of the at least one item 10 to determine whether the at least one item 10 is damaged as a result of the move.

Alternatively, the processing unit 181 may automatically compare the two images to determine whether the current state of the at least one item 10 is substantially similar to the original state of the at least one item 10. As such, the processing unit 181 may highlight and/or zoom to at least a portion of the at least one item 10 where damage has been sustained.

The processing unit 181 may create a missing alert in response to determining that the at least one item 10 is missing. For example, the mover may indicate the move is complete, and another processing unit 181 via another communication unit 182 may transmit a complete message to the communication unit 182. The processing unit 181 may send a display command to the display unit 130 to display the missing alert in response to receiving the complete message from the communication unit 182, and a determination that the at least one item 10 is missing.

Moreover, the data associated with the barcode 11 may be updated by the processing unit 181 in response to comparison of the current state of the at least one item 10 and the original state of the at least one item 10.

The power source 190 may include a battery, such as lithium-ion, nickel cadmium, nickel metal hydride, alkaline, etc., but is not limited thereto. Alternatively, the power source 190 may be a power inlet and/or a solar cell.

The power source 190 may provide power to at least one of the imaging unit 120, the display unit 130, the scan button 140, the camera button 150, the transmission button 160, the power button 170, and the control unit 180.

Therefore, the three-dimensional scanning and tracking device 100 may facilitate moving by tracking items moved during transport. The three-dimensional scanning and tracking device 100 may be portable, and an ideal solution to determine a state of items, such as damage received thereto, such that the moving company may be held accountable for poor management of the items.

The present general inventive concept may include a three-dimensional scanning and tracking device 100 to track at least one item 10, the three-dimensional scanning and tracking device 100 including a main body 110, an imaging unit 120 disposed on at least a portion of the main body 110, a display unit 130 disposed on at least a portion of a center of the main body 110, a scan button 140 disposed on at least a portion of the main body 110 to scan a barcode 11 of the at least one item 10 using the imaging unit 120 in response to depressing the scan button 140 and orienting the imaging unit 120 toward the barcode 11, and a camera button 150 disposed on at least a portion of the main body 110 to perform a three-dimensional image capture of the at least one item 10 in response to depressing the camera button 150 and orienting the imaging unit 120 toward the at least one item 10, such that a three-dimensional image of the at least one item 10 is created and displayed on the display unit 130.

The three-dimensional scanning and tracking device 100 may further include a control unit 180 disposed within at least a portion of the main body 110 to store data including the three-dimensional image and the barcode 11 of the at least one item 10.

The three-dimensional scanning and tracking device 100 may further include a transmission button 160 disposed on at least a portion of the main body 110 to transmit the data to another three-dimensional scanning and tracking device 100 in response to being depressed.

The control unit 180 may create a missing alert in response to determining the at least one item 10 is missing after receiving a complete message of a move from the another three-dimensional scanning and tracking device 100.

The control unit 180 may compare the three-dimensional image to a current state of the at least on item 10 in response to depressing the camera button 150, such that the imaging unit 120 performs another three-dimensional image capture.

The control unit 180 may zoom in on a portion the at least one item 10 on the display unit 130 in response to identifying the at least one item 10 has been damaged based on the comparison.

The scan button 140 and the camera button 150 depressed simultaneously may create a holographic projection from the display unit 130 of the damage on the at least one item 10.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A three-dimensional scanning and tracking device to track at least one item, the three-dimensional scanning and tracking device comprising:
   a main body;
   an imaging unit disposed on at least a portion of the main body;
   a display unit disposed on at least a portion of a center of the main body;
   a scan button disposed on at least a portion of the main body to scan a barcode of the at least one item using the imaging unit in response to depressing the scan button and orienting the imaging unit toward the barcode;
   a camera button disposed on at least a portion of the main body to perform a three-dimensional image capture of the at least one item in response to depressing the camera button and orienting the imaging unit toward the at least one item, such that a three-dimensional image of the at least one item is created and displayed on the display unit;
   a control unit disposed within at least a portion of the main body to store data including the three-dimensional image and the barcode of the at least one item; and
   a transmission button disposed on at least a portion of the main body to transmit the data to another three-dimensional scanning and tracking device in response to being depressed; such that the control unit creates a missing alert in response to determining the at least one item is missing after receiving a complete message of a move from the another three-dimensional scanning and tracking device.

2. The three-dimensional scanning and tracking device of claim 1, wherein the control unit compares the three-dimensional image to a current state of the at least on item in response to depressing the camera button, such that the imaging unit performs another three-dimensional image capture.

3. The three-dimensional scanning and tracking device of claim 2, wherein the control unit zooms in on a portion the at least one item on the display unit in response to identifying the at least one item has been damaged based on the comparison.

4. The three-dimensional scanning and tracking device of claim 3, wherein the scan button and the camera button depressed simultaneously creates a holographic projection from the display unit of the damage on the at least one item.

5. A three-dimensional scanning and tracking device to track at least one item, the three-dimensional scanning and tracking device comprising:
   a main body;
   an imaging unit disposed on at least a portion of the main body;
   a display unit disposed on at least a portion of a center of the main body;
   a scan button disposed on at least a portion of the main body to scan a barcode of the at least one item using the imaging unit in response to depressing the scan button and orienting the imaging unit toward the barcode;
   a camera button disposed on at least a portion of the main body to perform a three-dimensional image capture of the at least one item in response to depressing the camera button and orienting the imaging unit toward the at least one item, such that a three-dimensional image of the at least one item is created and displayed on the display unit; and
   a control unit disposed within at least a portion of the main body to store data including the three-dimensional image and the barcode of the at least one item, such that the control unit compares the three-dimensional image to a current state of the at least on item in response to depressing the camera button, such that the imaging unit performs another three-dimensional image capture, such that the control unit zooms in on a portion the at least one item on the display unit in response to identifying the at least one item has been damaged based on the comparison, such that the scan button and the camera button depressed simultaneously creates a holographic projection from the display unit of the damage on the at least one item.

* * * * *